United States Patent Office 2,922,782
Patented Jan. 26, 1960

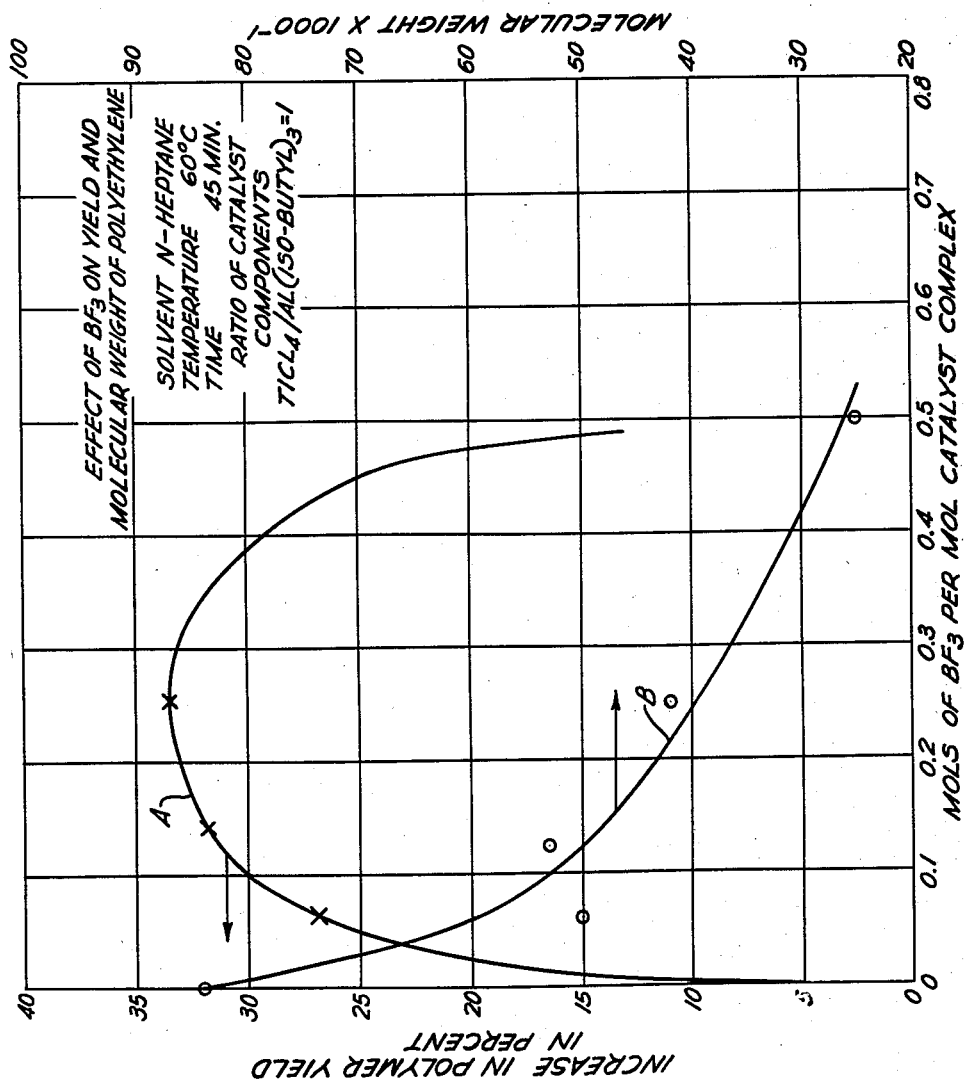

2,922,782

OLEFIN POLYMERIZATION PROCESS USING CATALYST OBTAINED BY MIXING A REDUCIBLE HEAVY METAL COMPOUND AND A REDUCING METAL - CONTAINING COMPOUND AND PROMOTED BY A BORON HALIDE

Russell G. Hay, Fox Chapel, Pa., assignor to Goodrich-Gulf Chemicals, Inc., Pittsburgh, Pa., a corporation of Delaware Application September 17, 1956, Serial No. 610,267

13 Claims. (Cl. 260—94.9)

This invention relates to an improved process of polymerizing olefins and relates particularly to improvements in a catalytic process of polymerizing ethylene to produce normally solid polymers.

In a low pressure process of polymerizing ethylene, ethylene is brought, preferably in the presence of an inert liquid reaction medium, into contact with a catalyst complex. The catalyst complex comprises an organo-aluminum compound and a heavy metal compound. The organo-aluminum compound contains at least one hydrocarbon radical linked through a carbon atom directly to the aluminum. Organo-aluminum compounds that can be employed can be represented by the structural formula:

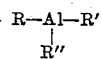

wherein:

R is a hydrocarbon radical such as an alkyl, aralkyl, aryl, alkaryl, or cycloalkyl radical, examples of such radicals being ethyl, propyl, isobutyl, amyl, hexyl, dodecyl phenyl-ethyl, benzyl, phenyl, ethylphenyl, tertiarybutylphenyl, and cyclohexyl radicals;

R' is also a hydrocarbon radical as above defined, an OR radical, hydrogen, or halogen such as chlorine, bromine, iodine, and fluorine; and R" is hydrogen or a hydrocarbon radical as defined above.

Examples of such organo-aluminum compounds are triisobutylaluminum; diisobutylaluminum hydride; dipropylaluminum chloride; phenylaluminum dihydride; dioctylaluminum bromide; cyclohexyl-bromo-aluminum hydride; ditertiarybutylphenylaluminum hydride; n-pentylisobutylaluminum chloride; dioctylaluminum hydride; and dipropylcyclohexyl aluminum.

The heavy metal compound constituting a component of the catalyst is a compound of a metal occupying the fourth to the sixth positions of the long periods of the periodic table in which the elements are arranged in short and long periods and the alkali metals occupy the first position (see Periodic Chart of the Elements on pages 392 and 393 of the 36th edition of "Handbook of Chemistry and Physics, 1954–1955," published by Chemical Rubber Publishing Company). These metals are titanium, zirconium, hafnium, vanadium, niobium (columbium), tantalum, chromium, molybdenum, tungsten and metals in the corresponding positions in the last long period in the so-called "actinium series," that is, thorium, protactinium and uranium. The preferred heavy metal compounds are the salts of the heavy metal with monovalent anions. Especially preferred are the halides (chlorides, bromides, iodides and fluorides) and acetyl acetonates of titanium, zirconium and thorium. Titanium halides, especially titanium chlorides, constitute preferred heavy metal compounds. Other heavy metal compounds include other inorganic salts of the metals such as oxyhalides, sulfates, nitrates and sulfides and other organic salts such as acetates and oxalates of the heavy metals.

Briefly stated, the process of the present invention comprises introducing a boron halide into the described polymerization system whereby the rate of the polymerization reaction and the properties of the polymer can be substantially modified.

As indicated above, the polymerization is ordinarily carried out in the presence of an inert liquid reaction medium. This medium is a hydrocarbon liquid such as a liquid alkane, examples of which are hexane and heptane, and liquid aromatic hydrocarbons, an example of which is benzene. The boron halide promoter can be added to the catalyst complex, which is usually dispersed in liquid reaction medium, prior to the addition of the complex to the polymerization zone, or it can be introduced directly into the polymerization zone. The boron halide promoter can be aged with the catalyst complex for a period, preferably between about 5 minutes and ½ hour, prior to its use in polymerization, especially when other considerations, such as reducing the tendency of polymer to adhere to reactor surfaces, dictate the use of an aging period.

The boron halide, being effective in increasing the initial reaction rate, is useful in the continuous polymerization of ethylene. It is also useful to promote batch polymerization and in this instance it is preferably added at the beginning of the reaction. The promoter can be added as a single amount, incrementally, or continuously to either the batch or continuous process. Boron halides being volatile can conveniently be continuously introduced into the polymerization zone in the inflowing stream of ethylene.

Boron halide promoters are effective to improve yield in amounts less than one mol of promoter per mol of catalyst complex, the upper limit for any preferred embodiment of my improved process depending on the conditions, especially catalyst content, of that embodiment. When boron fluoride is employed as the promoter and the mol ratio of the organo-aluminum compound and the heavy metal compound in the catalyst complex is between 1:2 and 2:1 a relative amount of boron fluoride, between a trace thereof and about 0.4 mol per mol of catalyst complex is effective to improve the polymerization results. It will be understood that the optimum amount of promoter should be determined for any particular reaction conditions. When using a ratio of the components of the catalyst complex between 1:4 and 4:1, this optimum amount will fall between a trace of boron fluoride and 0.5 mol per mol of catalyst complex.

It is sometimes desirable to employ reaction conditions such that the average molecular weight of the polyethylene product is higher than that which is best for the intended commercial use. In such cases, use of a boron halide promoter is especially advantageous as it will lower the molecular weight. The range of boron promoter which must be added to the polymerization system to reduce the average molecular weight as desired, falls unexpectedly within the range of promoter amounts which increase the yield, thus permitting the selection of a balanced optimum amount which will provide both improvements.

The halide promoters of my invention are especially effective when used with catalyst complexes in which the mol ratio of the organic aluminum compound to the heavy metal compound is greater than 0.5:1 and in which the concentration of the organic aluminum compound is at least 1.0 millimol per liter of liquid reaction medium. A concentration of the organic aluminum compound of less than 1.0 millimol per liter can be effectively employed when the ethylene and liquid reaction medium are very pure.

The boron halide most suitable as a promoter in the described polymerization process is boron fluoride, (BF₃), as it is readily available commercially and is gaseous and thus easily introduced into the system. Boron trichloride, a highly volatile liquid can also be conveniently introduced, either into the catalyst complex dispersed in liquid reaction medium or as a vapor in the ethylene or in nitrogen. Boron bromide and iodide, being less volatile, may be added more conveniently as a liquid either directly to the catalyst complex or as a periodic injection spray into the polymerization chamber.

The catalyst complex results from the mixture of a heavy metal compound, preferably titanium tetrachloride, and an aluminum organic or halo-organic compound, e.g. dibutyl aluminum chloride. The promoter halide disclosed herein is added in addition to and not in place of a halide or halides comprising a constituent or constituents of the catalyst complex.

In order that the invention may be more fully understood, reference should be had to the following numbered examples and to the curves shown in the drawing attached to and hereby made a part of this specification.

The polymerization runs described in the following numbered examples were carried out by introducing 400 milliliters of n-heptane as solvent into a closed reaction vessel, then adding to the solvent five millimols each of triisobutyl aluminum and titanium tetrachloride per liter of the solvent. Thereafter, boron fluoride, if used, was added to the solvent. Whether or not boron fluoride was added, the n-heptane-catalyst complex mixture was aged in the reaction vessel for 15 minutes. At the end of the aging period the introduction of ethylene was begun and continued for 45 minutes while maintaining the temperature in the reaction mixture at about 60° C. The ethylene was introduced at a rate such as to maintain an atmosphere of ethylene in the reaction vessel at about atmospheric pressure. This was accomplished by permitting a minimum amount of ethylene to escape from the vessel. At the end of the 45 minute reaction period the reaction was killed by the addition of methanol, the polymer was filtered from the solvent, washed with methanol and weighed. Since the same conditions with respect to the addition of ethylene were maintained in all the runs, the significant factors indicating the results obtained are the weight yield of polymer and the molecular weight of the polymer.

*Example 1*

In this example no boron fluoride was used. 33 grams of polyethylene product were obtained. The molecular weight of the polymer determined by means of the melt index, ASTM Method D1238-52T, was about 84,000.

*Example 2*

In this example boron fluoride was added to the solvent-catalyst mixture in an amount equal to 0.06 mol of boron fluoride per mol of catalyst complex. 42 grams of polyethylene product were obtained. The molecular weight of the polymer was about 50,000.

*Example 3*

In this example 0.125 mol of boron fluoride per mol of catalyst complex was used. 43 grams of polymer product were obtained. The molecular weight of the polymer was about 53,000.

*Example 4*

In this example 0.25 mol of boron fluoride per mol of the catalyst complex was used. 44 grams of polyethylene product were obtained. The molecular weight of the polymer was 42,000.

*Example 5*

In this example 0.5 mol of boron fluoride per mol of catalyst complex was used. 31 grams of the polyethylene product were obtained. The molecular weight of the polymer was about 25,000.

The data obtained in the foregoing examples are plotted on the curves on the accompanying drawing. Curve A shows the effect of the use of increasing amounts of boron fluoride, indicated on the abscissa as mols of boron fluoride per mol of catalyst complex, upon the polymer yield indicated on the left hand ordinate as percentage increase in yield. Under the conditions employed, boron fluoride from a trace to about 0.4 mol per mol of catalyst substantially improves the yield of solid polyethylene.

Curve B shows the effect of boron fluoride upon the average molecular weight of the product, which is indicated on the right hand ordinate. It can be seen that the addition of boron fluoride in an amount substantially greater than about 0.5 mol of boron fluoride decreases the average molecular weight to less than that of the solid polyethylene of commerce, and that a preferred range of boron fluoride, for the associated conditions of catalyst ratio and concentration, is between a trace and 0.3 mol of boron fluoride per mol of catalyst complex.

In the examples illustrated in the drawing, boron fluoride was added to catalyst complex that was dispersed in n-heptane and the mixture was aged for 15 minutes. As above-mentioned, such addition of boron fluoride between properly ascertained limits effected an increase in yield and a decrease in molecular weight of product polymer.

In other examples, even greater increase in yield (for example, 48.5%) was obtained when the boron fluoride was added to the catalyst complex dispersed in the n-heptane ten minutes after the polymerization of the ethylene had been initiated. This example employed the same catalyst concentration and ratio of catalyst components as employed in the above examples and 0.25 mol of boron fluoride per mol of catalyst complex was used. Other methods of continuous or batch-wise addition of boron halide can also be employed, so long as it is added after the components of the catalyst complex have been mixed.

Within a range of catalyst component mol ratios between 2:1 and 1:2 the effect of adding any fixed amount of boron halide appears to be about the same. The addition of 0.3 mol of boron fluoride per mol of catalyst complex having a ratio of components of two mols of titanium tetrachloride per mol of triisobutyl aluminum increased the yield of polymer by about 35 percent. The addition of the same amount of boron fluoride to a catalyst complex having an opposite ratio, i.e., two mols of triisobutyl aluminum per mol of titanium tetrachloride increased the yield of polymer by about 40 percent.

The rate of ethylene consumption in liters per five minutes per liter of liquid reaction medium was measured for three runs, a blank run (A) in which no boron fluoride was used, one (B) in which 100 ccs. of boron fluoride were added after the first ten minutes of the polymerization reaction, and one (C) in which boron fluoride was added continuously at the rate of 1 cc. per minute. The catalyst concentration was 27 millimols per liter of solvent, the ratio of catalyst components 1.0 mol of titanium tetrachloride per mol of aluminum isobutyl sesquibromide and the solvent was n-heptane. Aluminum isobutyl sesquibromide is a mixture of diisobutyl aluminum bromide and monoisobutyl aluminum dibromide and in this example constituted a 50-50 mixture of each component. After 20 minutes reaction, the consumption rate of run A was 2.5 liters per 5 minutes, the rate of run B was 5.2 liters per 5 minutes, and the rate of run C was 3.0 liters per 5 minutes. In each of the runs, however, the consumption rates dropped off rapidly and thus residence times of one-half hour or less are most effective.

While the preferred and usual range of concentration of boron fluoride, as shown above, is between slightly above 0 to 0.5 mol of boron fluoride per mol of catalyst complex, the most enhanced effects for any particular reaction conditions can readily be determined in laboratory apparatus by varying the amount of boron halide that is added and measuring the yield and molecular weight of polymer obtained. In each instance, also, the preferability of adding boron fluoride or other halide to the catalyst complex, and of aging the promoted catalyst or introducing the boron halide promoter directly into the reaction zone can be readily ascertained by the described measurement of yield and molecular weight of resulting polymer.

The addition of boron halide increases the initial rate of reaction, the yield in a given period, and provides a product of lower average molecular weight than otherwise would be obtained. Undesirably high average molecular weight product can thus be avoided, and lower catalyst concentrations which would otherwise produce polymer of too high molecular weight can be effectively employed.

It will be understood that although the specific description has been concerned with the polymerization of ethylene, the polymerization of other olefins with the catalysts disclosed can be modified and improved with the use of a boron halide. Such other olefins include compounds containing an aliphatic double bond, especially those in which the double bond is in the 1-position. Typical examples of these olefins are propylene, butylenes, pentenes, particularly isopentene, hexenes, etc., and the diolefins, such as 1,3-butadiene and isoprene.

The present process can and usually will be carried out at relatively low pressures. The operativeness of the process, however, is not dependent upon the use of low pressures, and elevated pressures can be used; although pressures higher than about 500 pounds per square inch would not ordinarily be used except for an operation where the reaction is carried out in an autoclave and the ethylene to be polymerized is introduced into the autoclave initially. Similarly, the temperature is not a critical condition of the process. Preferred temperatures are within the range of about 0° to 100° C.

Obviously many modifications and variations of the invention as hereinabove set forth may be made without departing from the spirit and scope thereof and only such limitations should be imposed as are indicated in the appended claims.

I claim:

1. In a process of polymerizing an olefin to form a normally solid polyolefin wherein the olefin is contacted with a catalyst comprising an organo-aluminum compound containing at least one hydrocarbon radical linked through a carbon atom to the aluminum and a compound of a metal selected from the metals occupying the fourth to the sixth positions of the long periods of the periodic table, the improvement which comprises promoting the catalytic action of the catalyst by incorporating a boron halide with said catalyst.

2. A process in accordance with claim 1 in which the olefin is ethylene.

3. A process in accordance with claim 1 in which the boron halide is boron fluoride.

4. A process of polymerizing an olefin to form a normally solid polyolefin which comprises passing said olefin into contact with a mixture comprising an organo-aluminum compound containing at least one hydrocarbon radical linked through a carbon atom to the aluminum, a compound of a metal selected from the metals occupying the fourth to the sixth positions of the long periods of the periodic table, and a promoting amount of a boron halide, the amount of said organo-aluminum compound and the amount of said compound of a metal being such that the molar ratio of these compounds is about 1:4 and 4:1.

5. A process in accordance with claim 4 in which the olefin is ethylene and the boron halide is boron fluoride.

6. A process of polymerizing an olefin to form a normally solid polyolefin comprising adding to an inert liquid reaction medium a catalyst comprising an organoaluminum compound containing at least one hydrocarbon radical linked through a carbon atom to the aluminum and a compound of a metal selected from the metals occupying the fourth to the sixth positions of the long periods of the periodic table, thereafter introducing a promoting amount of a boron halide into said inert liquid reaction medium containing said catalyst, passing the olefin to be polymerized through said reaction medium containing said catalyst and said boron halide to polymerize said olefin, and recovering the normally solid polyolefin.

7. A process of polymerizing ethylene to form a normally solid polyethylene comprising adding to an inert liquid reaction medium a catalyst comprising triisobutyl aluminum and a halide of a metal selected from the metals occupying the fourth to the sixth positions of the long periods of the periodic table, thereafter introducing a promoting amount of a boron fluoride into said inert liquid reaction medium containing said catalyst, passing the ethylene to be polymerized through said reaction medium containing said catalyst and said boron fluoride to polymerize said ethylene, and recovering a normally solid polyethylene.

8. A process in accordance with claim 7 in which said halide of a metal is titanium tetrachloride.

9. A process of polymerizing an olefin to form a normally solid polyolefin comprising adding to an inert liquid reaction medium a catalyst comprising an organo-aluminum compound containing at least one hydrocarbon radical linked through a carbon atom to the aluminum and a salt of a metal selected from the metals occupying the fourth to the sixth positions of the long periods of the periodic table, said organo-aluminum compound and said metal salt being added in a molar ratio of about 1:4 to 4:1, thereafter introducing a boron halide into said inert liquid reaction medium containing said catalyst in a promoting amount between a trace and one mol per mol of said catalyst, passing the olefin to be polymerized through said reaction medium containing said catalyst and said boron halide to polymerize said olefin, and recovering a normally solid polyolefin.

10. A process of polymerizing ethylene to form a normally solid polyethylene comprising adding to an inert liquid reaction medium a catalyst comprising an organo-aluminum compound containing at least one hydrocarbon radical linked through a carbon atom to the aluminum and a salt of a metal selected from the metals occupying the fourth to the sixth positions of the long periods of the periodic table, said organo-aluminum compound and said metal salt being added in a molar ratio of about 1:4 to 4:1, thereafter introducing boron fluoride into said inert liquid reaction medium containing said catalyst in a promoting amount between a trace and one mol per mol of said catalyst, passing ethylene through said reaction medium containing said catalyst and said boron fluoride to polymerize said ethylene, and recovering a normally solid polyethylene.

11. A process of polymerizing ethylene to form solid polyethylene wherein the catalyst comprises a mixture of an organo-aluminum compound containing at least one hydrocarbon radical linked through a carbon atom to the aluminum and a salt of a metal selected from the metals occupying the fourth to the sixth positions of the long periods of the periodic table, said process comprising dispersing in an inert liquid hydrocarbon medium said organo-aluminum compound and said metal salt in a molar ratio of about 4:1 to 1:4 to form a catalyst complex, permitting said catalyst complex to age in said inert liquid hydrocarbon medium, thereafter introducing a boron halide into contact with said complex in said medium in a promoting amount between a trace and 0.5 mol of boron halide per mol of complex, bringing ethylene into contact with said catalyst complex and said boron halide in said inert liquid hydrocarbon medium to effect a polymerization of the ethylene, and recovering resulting solid polyethylene.

12. The process of claim 11 in which said organo-aluminum compound is triisobutyl aluminum, said salt of a metal is titanium tetrachloride and said boron halide is boron fluoride.

13. The process of polymerizing olefins which comprises intimately contacting a normally gaseous olefin at polymerization conditions including pressures not substantially exceeding 250 atmospheres with a catalyst obtained by mixing a reducible compound of a heavy metal with a reducing metal-containing material and carrying out said contacting in the presence of a small amount of added boron fluoride.

References Cited in the file of this patent

UNITED STATES PATENTS 2,404,788   Burke et al. _____ July 30, 1946

FOREIGN PATENTS 533,362   Belgium _____ May 16, 1955

UNITED STATES PATENT OFFICE

CERTIFICATE OF CORRECTION

Patent No. 2,922,782 January 26, 1960

Russell G. Hay

It is hereby certified that error appears in the printed specification of the above numbered patent requiring correction and that the said Letters Patent should read as corrected below.

Column 1, line 36, after "dodecyl" insert a comma.

Signed and sealed this 12th day of July 1960.

(SEAL)
Attest:

KARL H. AXLINE
Attesting Officer

ROBERT C. WATSON
Commissioner of Patents